United States Patent [19]
Pankhurst

[11] Patent Number: 5,715,491
[45] Date of Patent: Feb. 3, 1998

[54] HANDSTRAP FOR USE ON AN IMAGING DEVICE

[75] Inventor: Paul Hayes Pankhurst, London, England

[73] Assignee: Polaroid Corporation, Cambridge, Mass.

[21] Appl. No.: 753,286

[22] Filed: Nov. 22, 1996

[51] Int. Cl.$^6$ ................................................ G03B 21/14
[52] U.S. Cl. ................................................ 396/423
[58] Field of Search ................................ 396/419, 420, 396/423, 424, 428; 348/373, 376; 352/243; 294/139, 168

[56] References Cited

U.S. PATENT DOCUMENTS

| | | | |
|---|---|---|---|
| 4,208,113 | 6/1980 | Prochnow | 354/82 |
| 4,348,095 | 9/1982 | Suzuki et al. | 396/420 X |
| 4,819,016 | 4/1989 | Leonard et al. | 354/82 |

*Primary Examiner*—Howard B. Blankenship
*Attorney, Agent, or Firm*—Robert A. Sabourin

[57] ABSTRACT

An imaging device is fitted with a handstrap adjustable for holding the device with either the left or right hand without having to detach the handstrap from the body of the imaging device. Such an imaging device includes: a body; a conduit fixedly attached to the body and, a strap having a predetermined length with an intermediate portion and first and second end portions, each of the end portions being attached to the body, the intermediate portion being movable through the conduit to allow formation of a loop on either side thereof which is sufficient in size to accommodate a single hand of a user to engage the imaging device.

19 Claims, 5 Drawing Sheets

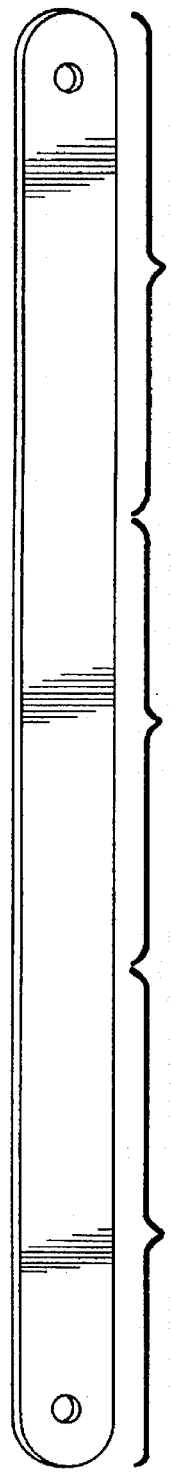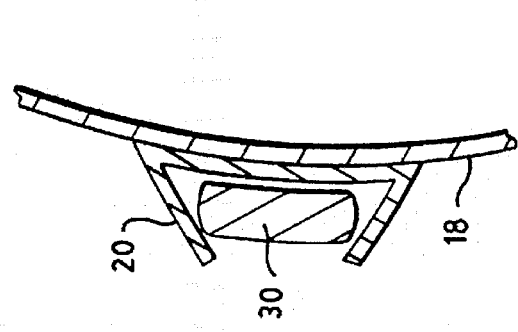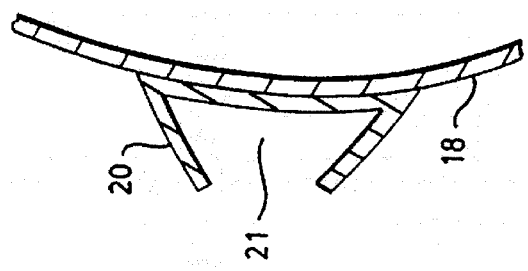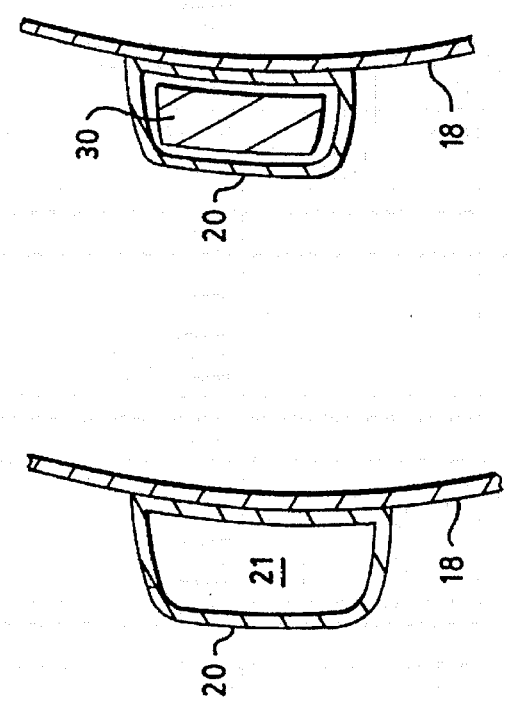

HANDSTRAP FOR USE ON AN IMAGING DEVICE

BACKGROUND OF THE INVENTION

1. Field of the Invention

The present invention relates generally to providing a handstrap for use with an imaging device and, more particularly, to providing an inexpensive handstrap which is sturdy, reliable and easily movable into position so that a hand-held imaging device can be held with either a left or right i.e. one, hand.

2. Description of the Prior Art

It is well known to provide a photographic camera with a detachable or adjustable handgrip which is grasped to hold the camera body steady when a shutter release button on the body of the camera is manually depressed to initiate imaging a scene through the optics of the camera to a photosensitive surface. At times this operation requires the use of two hands. However, with the current trend towards manufacturing small hand-held cameras and other imaging devices, such as camcorders and scanners, these devices have been designed to be held, and in some cases operated, solely with one hand. For instance, U.S. Pat. No. 4,819,016 issued Apr. 4, 1989 to Leonard et al. discloses a camera which is both held and operated with one hand. Leonard's camera includes a handgrip which is detachable and can be secured to either the left side of the camera for securing and operating the camera with the left hand, or to the right side of the camera for securing and operating the camera with the right hand. The shutter release button is positioned on the top of the camera substantially midway between its two sides.

U.S. Pat. No. 4,208,113 issued Jun. 17, 1980 to Prochnow discloses a camera handgrip which includes a shutter release button and is pivotal about a pivot axis that extends substantially perpendicular to the optical axis of the camera lens. The handgrip may be detached from one side and secured onto the other side of the camera as desired for either left or right handed use.

A major disadvantage to a camera handgrip of the type as described above is the requirement that, in order to change the position of the handgrip for use with one hand or the other, the handgrip must first be removed from one side of the camera, and then must be re-attached to the other side of the camera.

SUMMARY OF THE INVENTION

The above and other disadvantages of handgrips found in the prior art are overcome by the current invention of a camera or other, preferably hand-held, imaging device having a handstrap adjustable, without having to detach the handstrap from the camera body, for holding the camera with either the left or right hand. Such an imaging device includes: housing means; means on the housing means for defining a passage through which means for engaging a hand to the imaging device will pass; and, the hand engageable means having a predetermined length with an intermediate portion and first and second end portions, each of the end portions being couplable to the housing means, the intermediate portion being movable through the passage defining means to allow formation of a loop on either side thereof which is sufficient in size to accommodate a single hand of a user to engage the imaging device.

BRIEF DESCRIPTION OF THE DRAWINGS

The aforementioned aspects and other features of the invention are described in detail in conjunction with the accompanying drawings in which the same reference numerals are used throughout for denoting corresponding elements and wherein:

FIG. 5 is a side view of a handstrap for use with a camera;

FIGS. 6A and 6B are cross-sectional views of a first embodiment of a passage defining means in accordance with the invention; and FIGS. 6C and 6D are cross-sectional views of a second embodiment of a passage defining means in accordance with the invention.

DETAILED DESCRIPTION OF THE PREFERRED EMBODIMENTS

Figure 1:
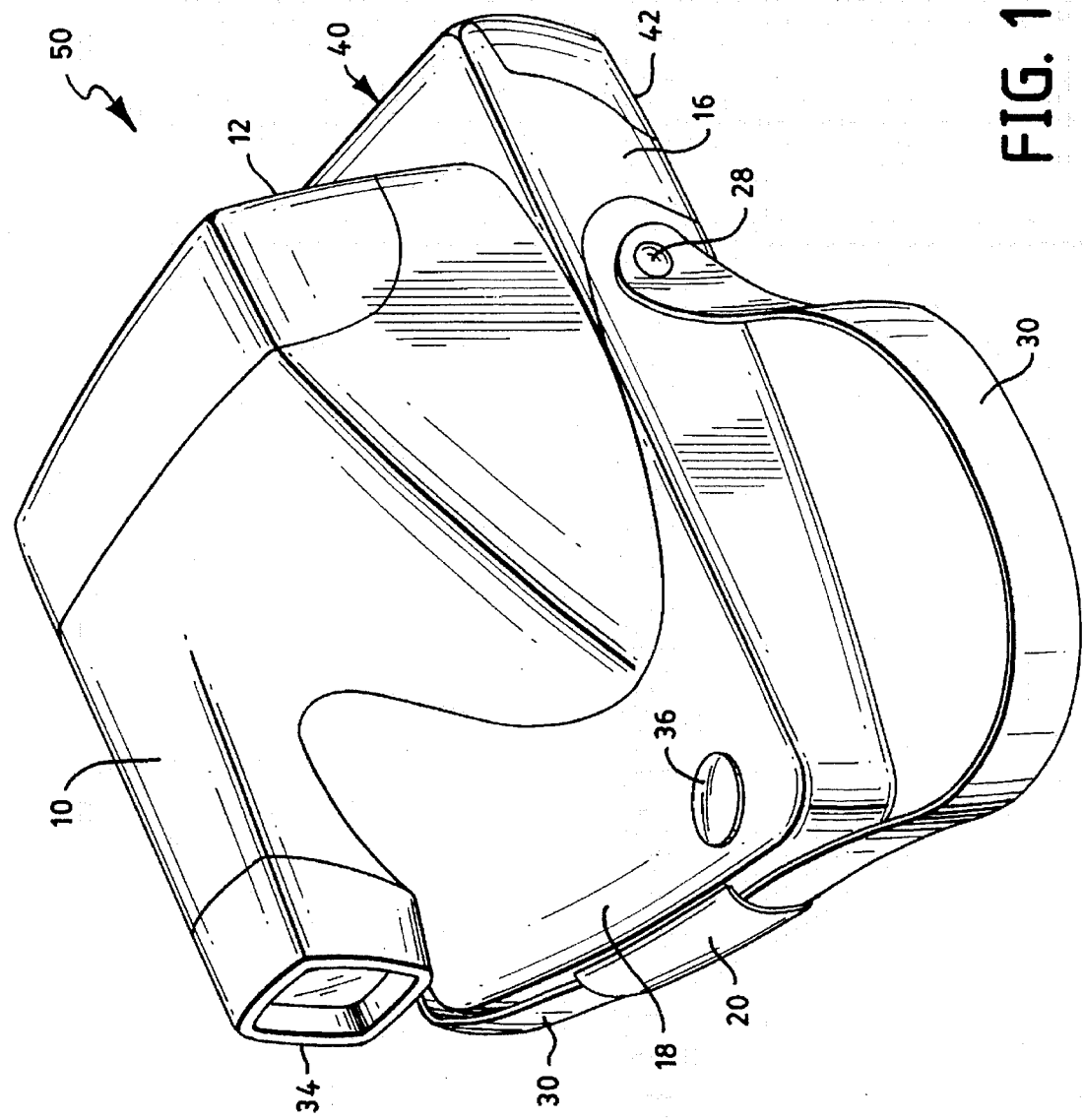
FIG. 1 is right rear perspective view of one embodiment of a camera having a handstrap in accordance with the invention.
Figure 2:
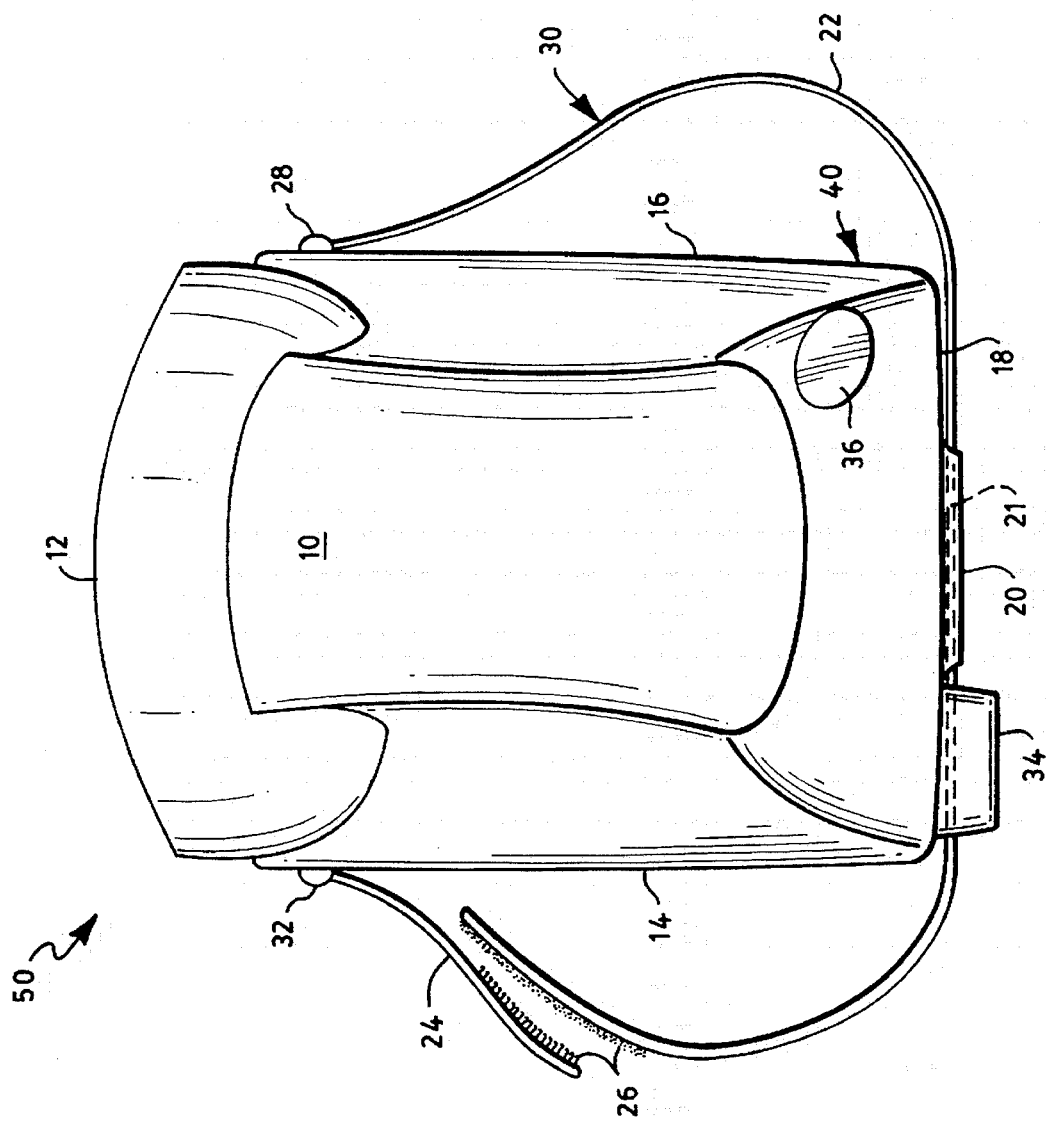
FIG. 2 is a top view of the camera of FIG. 1 whereby slack in the handstrap is appropriated on either side of the camera.

The preferred embodiment described and illustrated herein depicts a hand-held photographic camera with an attached, or attachable, handstrap for holding the camera with one hand. However, the handstrap is envisioned for use with any imaging device whether hand-held or otherwise supported, as with a tripod, and whether the imaging device is manually or automatically operable, and whether the imaging device requires one or two hands for operation. Imaging devices for use with the handstrap include, but are not limited to, cameras, camcorders and scanners.

The handstrap described herein allows the user the option of stabilizing the imaging device by holding it with either hand. This is made possible by quick and easy adjustment of the handstrap between first and second positions, e.g. left-handed and right-handed positions, without a requirement for first removing the handstrap from the body of the imaging device. Since various features of the imaging device which are not effected by the current invention are well known, only those features which cooperate or interact with the handstrap will be described in detail. It is understood, however, that other components of the imaging devices not specifically shown or described are readily available in various forms as known to persons of ordinary skill in the art.

FIGS. 1, 2, 3 and 4 each portray a view of a single embodiment of a camera 50 having a housing means, e.g. a main body, 40 defined by a left side 14, a right side 16, a front wall 12, a back wall 18, a top wall 10 and a bottom wall 42. The back wall 18 is defined in part by a passage defining means or conduit 20 containing a passageway 21. The conduit 20 may be molded as part of the main body 40, or it may be a separate add-on component which could be fastened by any known fastening means to the main body 40, or to any other portion of the camera 50. None of the various fastening means are shown, but they include adhesives, screws, bolts, snap-together parts, etc.

A handstrap 30, defined in the embodiment of FIGS. 1–4 by two pieces 22 and 24, passes through the passageway 21 of the conduit 20. The handstrap 30 is made of a flexible elongated material which is strong enough to support the camera 50, flexible enough to freely conform to the shape of one's hand, and flexible enough to easily pass through the conduit 20. In the illustrated embodiment, the two sections 22 and 24 have a total predetermined length which is adjustable to accommodate different hand sizes per attaching means 26, which could be Velcro™ strips or any other known means for attaching together two or more sections of a handstrap.

The handstrap 30 of FIG. 5 is a single piece and the handstrap 30 of FIGS. 1-4 is two-pieced having sections 22 and 24. However, the handstrap 30 could include any number of sections as desired. Preferably, the total length of the attached sections is appropriate to accommodate various hand sizes for engaging a hand to the camera 50. Each handstrap 30 illustrated in FIGS. 1-4 is fastened adjacent to one end of the handstrap 30 to the left side 14 of the main body 40 of the camera 50 by a first connecting means 32, and each handstrap 30 is fastened adjacent to another end of the handstrap 30 to the right side 16 of the main body 40 by a second connecting means 28. The first and second connecting means 32 and 28, respectively, may include any known means for connecting a strap to a housing such as, but not limited to, machine screws, bolts, rivets or snap-on clips. Preferably each connecting means 32 and 28 will allow pivotal movement of the handstrap 30 thereabout for increasing the flexibility of the handstrap in properly fitting over different size hands. In one embodiment, the connecting means 32 and 28 permanently secures the handstrap 30 to the main body 40 of the camera 50 whereas, in another embodiment, the connecting means 32 and 28 provides the handstrap 30 to be attachable and detachable to and from the main body 40. Furthermore, the housing means 40 is not limited to a main body or main camera housing of a camera, but could be an adjunct thereto.

FIG. 5 illustrates one embodiment of a single piece handstrap 30 having first and second end portions 44 and 48 and an intermediate portion 46. Each of the end portions 44 and 48 is attachable, e.g. couplable, to the housing means 40 at first and second connecting means 32 and 28, respectively, and the intermediate portion 46 is movable and guided through the passage defining means 20 to allow formation of a loop on either side thereof which is sufficient to accommodate a single hand of an user to engage the camera 50.

In the illustrated embodiment of FIGS. 1-4, 6A and 6B, the passage defining means 20 is a conduit which provides and defines a passageway 21 as shown in FIG. 6A where the conduit 20 is attached to the rear wall 18 of the housing 40 of the camera 50. FIG. 6B shows the handstrap 30 passing through the passageway 21. The passageway 21 requires dimensions which allow free movement of the handstrap 30 therethrough. In a second embodiment, the passage defining means 20 may be structured, for instance, as shown in FIGS. 6C and 6D. Here, means 20 engages the handstrap 30 in a passageway 21 which is open on one side in contrast to the closed conduit of FIG. 6A. These are but two of the many known means for providing and defining a passageway to allow passage of a handstrap 30.

Figure 3:
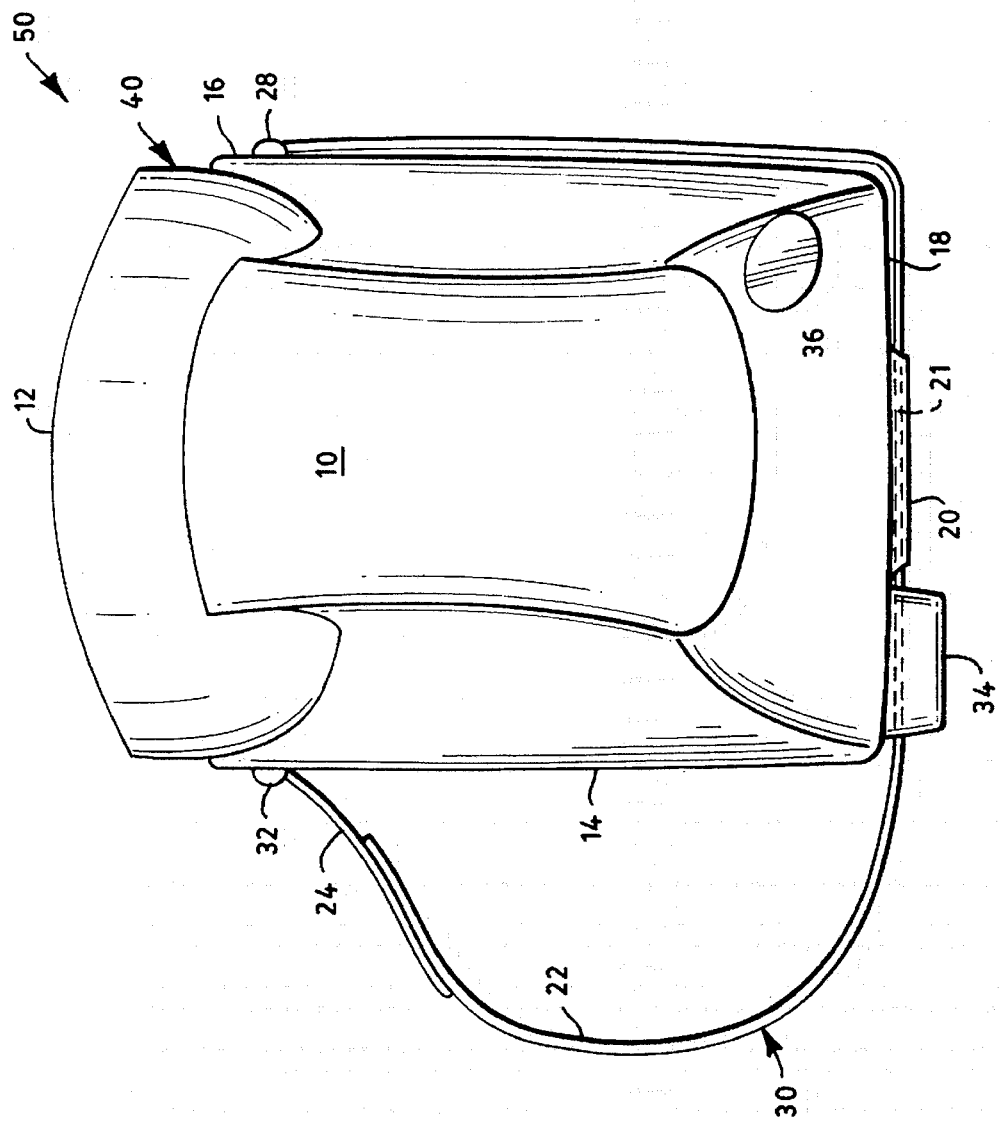
FIG. 3 is a top view of the camera of FIG. 1 whereby slack in the handstrap is moved towards the left side of the camera for left-handed use.
Figure 4:
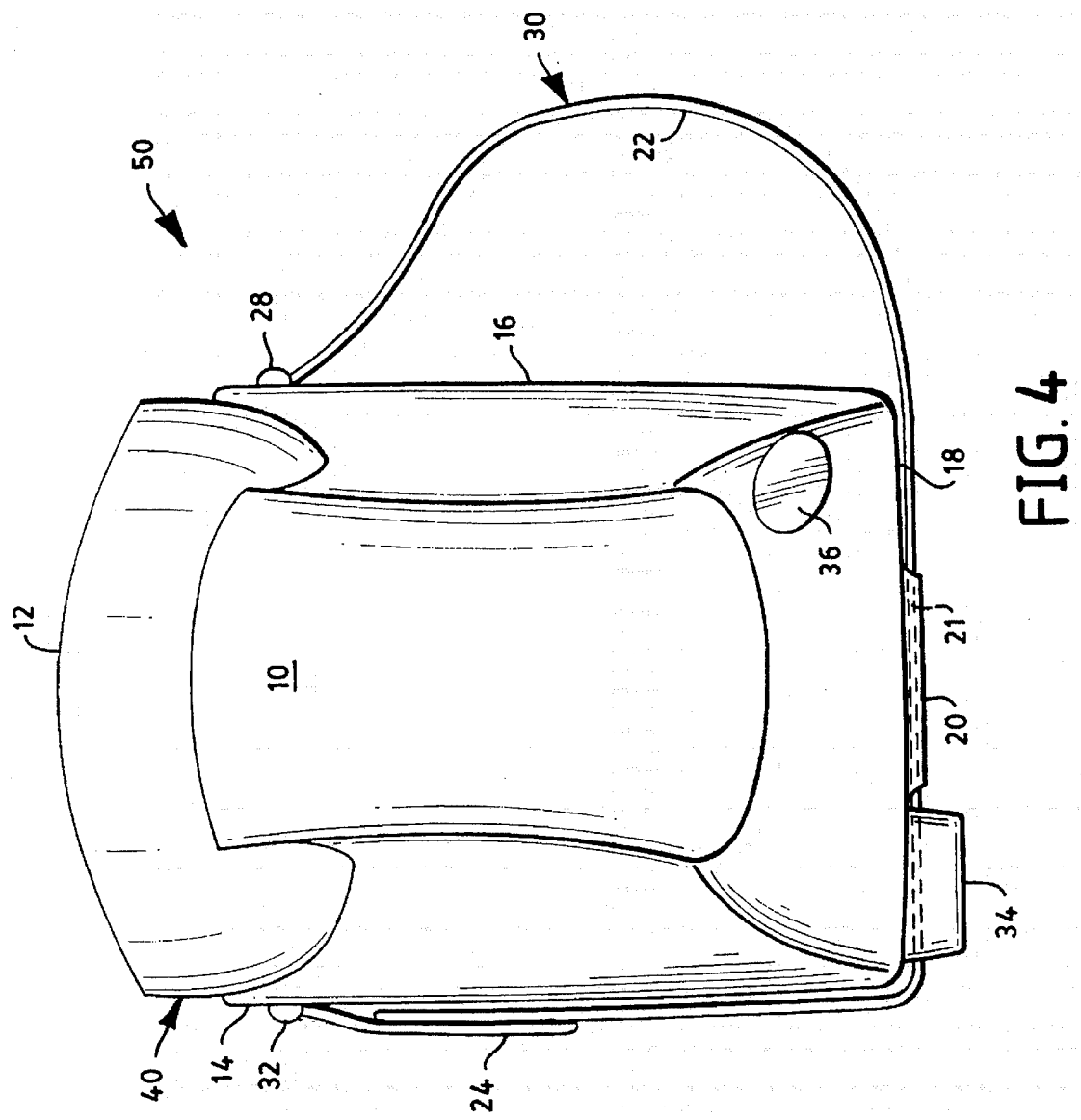
FIG. 4 is a top view of the camera of FIG. 1 whereby slack in the handstrap is moved towards the right side of the camera for right-handed use.

FIG. 3 shows the handstrap 30 pulled through the passage defining means 20 so that the slack in the handstrap 30 forms a loop which resides adjacent to the left side 14 of the camera 50. FIG. 4 shows the handstrap 30 pulled through the conduit 20 so that the slack in the handstrap 30 forms a loop which resides adjacent to the right side 16 of the camera 50. Although the preferred embodiments illustrate a carrying handstrap, the present invention contemplates other devices or means engageable by a hand for facilitating formation of a loop or the like which enables a hand to fit therein.

In the broadest sense, the passage defining means 20 may be placed anywhere on the main body 40 of the camera 50 (e.g. on the front wall 12, the back wall 18, the left side 14, the right side 16, the top wall 32 or the bottom wall 42). One purpose of the passage defining means 20 is to provide means, between first and second connecting means 32 and 28, for restraining the handstrap 30 adjacent to the main body 40. Another purpose of the passage defining means 20 is to provide a passageway for movement of the slack of the handstrap 30. As with the passage defining means 20, the first and second connecting means 32 and 28 may also be placed anywhere on the camera housing (e.g. on the front wall 12, the back wall 18, the left side 14, the right side 16, the top wall 32 or the bottom wall 42), providing that they are positioned to allow movement of the slack of the handstrap 30 through the passage defining means 20 to accommodate holding the imaging device 50 with one hand.

It is to be understood that the above described embodiments are merely illustrative of the present invention and represent a limited number of the possible specific embodiments that can provide applications of the principles of the invention. Numerous and varied other arrangements may be readily devised in accordance with these principles by those skilled in the art without departing from the spirit and scope of the invention as claimed.

What is claimed is:

1. An imaging device comprising: housing means; means on said housing means for defining a passage through which means for engaging a hand to said imaging device will pass; and, said hand engageable means having a predetermined length with an intermediate portion and first and second end portions, each of said end portions being attached to said housing means, said intermediate portion being movable through said passage defining means to allow formation of a loop on either side thereof which is sufficient in size to accommodate a single hand of a user to engage said imaging device.

2. An imaging device comprising: a main body; means on said main body for defining a passage through which a handstrap can pass and for guiding such passage of a handstrap through said passage; and, said handstrap having a predetermined length with an intermediate portion and first and second end portions, each of said end portions being coupled to said main body, said intermediate portion being movable through said passage and guided by said passage defining means to allow formation of a loop on either side of said passage defining means which is sufficient in size to accommodate a single hand of a user for allowing holding of the imaging device with a single hand.

3. An imaging device, comprising:
   a housing defined by a left side, a right side, a front wall, a back wall, a top wall and a bottom wall;
   a conduit fixedly attached to said housing; and
   a handstrap passing through said conduit, an adjacent part of a first end of said handstrap being attached to said housing by first connecting means and, an adjacent part of a second end of said handstrap being attached to said housing by second connecting means, said handstrap having slack movable through said conduit to accommodate holding said imaging device with one hand.

4. The imaging device of claim 3, wherein said conduit is fixedly attached to one of said left side, said right side, said front wall, said back wall, said top wall and said bottom wall.

5. The imaging device of claim 3, wherein said conduit is molded as part of said housing.

6. The imaging device of claim 3, wherein said adjacent part of said first end of said handstrap is fixedly attached to said housing at one of said left side, said right side, said front wall, said back wall, said top wall and said bottom wall.

7. The imaging device of claim 6, wherein said adjacent part of said second end of said handstrap is fixedly attached to said housing at one of said left side, said right side, said front wall, said back wall, said top wall and said bottom wall.

8. The imaging device of claim 3, wherein said handstrap is made of a flexible material.

9. The imaging device of claim 3, wherein said slack is movable through said conduit to form a loop adjacent to said left side of said housing to accommodate holding said imaging device with a left hand, and said slack is movable through said conduit to form a loop adjacent to said right side of said housing to accommodate holding said imaging device with a right hand.

10. The imaging device of claim 3, wherein said first connecting means allows pivotal movement of said handstrap.

11. The imaging device of claim 3, wherein said second connecting means allows pivotal movement of said handstrap.

12. The imaging device of claim 3, wherein said handstrap is detachable from said housing at said first connecting means.

13. The imaging device of claim 3, wherein said handstrap is detachable from said housing at said second connecting means.

14. The imaging device of claim 3, wherein said handstrap comprises at least two sections attachable and detachable to and from one another by attaching means.

15. A hand-held camera, comprising:
a main body defined by a left side, a right side, a front wall, a back wall, a top wall and a bottom wall, said back wall defined in part by a conduit; and
a flexible elongated handstrap passing through said conduit, said handstrap, adjacent to one end, fastened to said left side of said main body by first connecting means and, adjacent to another end, fastened to said right side of said main body by second connecting means, said handstrap having slack defining a loop to accommodate holding said imaging device with one hand, said slack movable through said conduit to reside adjacent to said left side of said main body and said slack movable through said conduit to reside adjacent to said right side of said main body.

16. The imaging device of claim 15, wherein said imaging device is holdable by a left hand when said slack is moved through said conduit to reside adjacent to said left side of said main body.

17. The imaging device of claim 16, wherein said imaging device is holdable by a right hand when said slack is moved through said conduit to reside adjacent to said right side of said main body.

18. The imaging device of claim 16, wherein said handstrap comprises at least two sections attachable and detachable by attaching means.

19. The imaging device of claim 16, wherein said handstrap is detachable from said main body at both said first and second connecting means.

* * * * *